United States Patent Office 3,040,157
Patented June 19, 1962

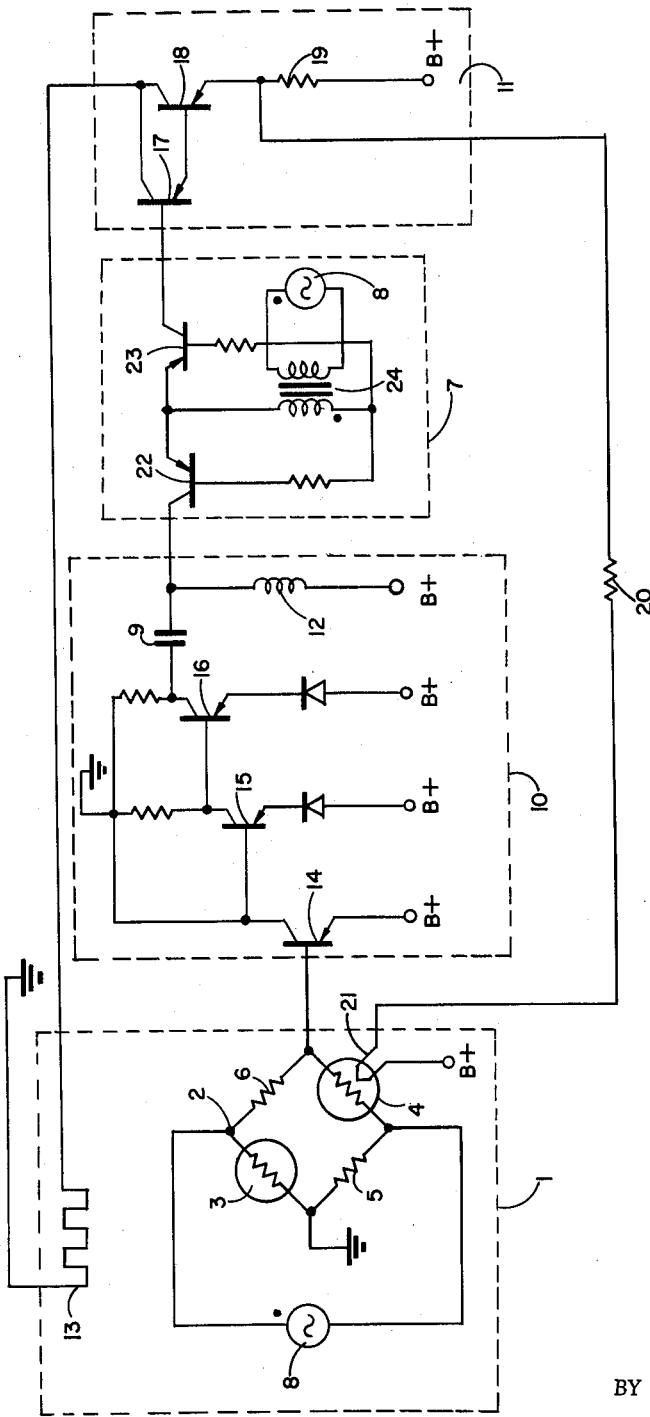

3,040,157
TEMPERATURE CONTROL SERVO SYSTEM
Russell E. Hukee, Santa Ana, Calif., assignor to
North American Aviation, Inc.
Filed Sept. 30, 1959, Ser. No. 843,550
6 Claims. (Cl. 219—20)

This invention relates to a temperature control system and more particularly to a servo system for automatically controlling the temperature of a material having a lead network which anticipates changes in temperature of the material.

Temperature controlled servo systems operate to control the temperature of an oven at some desired operating temperature. A servo loop is provided wherein a detecting device detects changes of temperature from a predetermined desired level and regulates the amount of current supplied to the oven heater in accordance with the changes in temperature in order to maintain the temperature at the desired operating point. The precision to which the oven temperature can be controlled will depend chiefly on the overall loop gain in the servo loop. Because of the comparatively long thermal time constant between the oven heater at the output of the servo and the temperature detecting device at the input of the servo, the overall loop gain is limited thereby limiting the precision to which the oven temperature can be controlled. Additionally, a long thermal time constant between the input and output of the servo system may cause the servo loop to oscillate further limiting the control of the temperature.

Electronic components and systems installed in today's missiles and aircraft have operating characteristics which are so critical at times as to demand precision temperature control. For example, in today's autonavigator systems there is required a reference time measurement. This time measurement is provided by a precision electronic clock. The electronic elements in the clock are of such precise nature that a temperature control to within ±0.1° C. at all times for operation is required. Accordingly, there is needed a temperature control system which will meet these requirements.

The device of this invention provides an automatically controlled servo system for maintaining the temperature in an oven at a predetermined precision constant level. Utilizing a servo system with high gain, stability is provided by the accomplishment of a short thermal time constant between the oven heater and the temperature detecting bridge. Further stability and precision is accomplished by a feedback lead from the output of the servo loop to the input of the detecting means which anticipates changes of temperature in the oven.

It is therefore an object of this invention to provide a means for automatically controlling the temperature of a material.

It is another object of this invention to provide a servo system for automatically controlling the temperature of a material.

It is a further object of this invention to provide a servo system for automatically controlling the temperature of a material and wherein is provided a lead network in the servo system for anticipating the changes of temperature of the material.

It is a still further object of this invention to provide a servo system of high gain for automatically controlling the temperature of a material.

It is still another object of this invention to provide a servo system for automatically controlling the temperature of a material in which a high gain in the servo system accomplishes a short thermal time constant between the material and the heater.

It is a further object of this invention to provide a transistorized servo system for automatically controlling the temperature of a material and wherein is provided an auxiliary heating element responsive to a negative feedback loop from the output of the servo system to anticipate changes in temperature of the material.

Other objects of invention will become apparent from the following description taken in connection with the accompanying drawing in which the single figure is a schematic diagram of the preferred embodiment of the invention.

Referring to the single figure, a precision electronic component or system may be enclosed in a suitable oven 1 to be controlled in temperature. A temperature detecting bridge network 2 measures the temperature in oven 1 at all times. Bridge network 2 utilizes a Wheatstone bridge having thermistor elements 3 and 4 located in opposite legs of the bridge to detect the temperature of the material in the oven 1. Thermistors 3 and 4 have high temperature coefficients of resistances and detect minute changes of temperature in oven 1. Resistors 5 and 6 located at opposite legs of bridge network 2 have low temperature coefficient units. Bridge network 2 has a pair of input terminals connected to receive an alternating current driving voltage from A.-C. source 8 and a pair of output terminals connected to present the output of the temperature detecting unit. One output terminal is grounded and the other output terminal is connected to the input of amplifier 10. The output of bridge network 2 is coupled to high gain amplifier 10 which may have a voltage gain of 10,000. Amplifier 10, as illustrated, utilizes three transistor gain stages. The output of amplifier 10 is a highly amplified signal indicative of the change in temperature of oven 1 which is coupled through capacitor 9 and inductor 12 to the input of phase detector 7. Phase detector 7 comprises PNP transistors 22 and 23 with the collector of transistor 22 connected to receive the error signal from amplifier 10. A portion of A.-C. source 8 is supplied to the common connection of the emitters of transistors 22 and 23 through transformer 24 to provide a reference signal. The phase relationship between the signal applied to the emitters of transistors 22 and 23 and the error signal at the collector of transistor 22 is such that if the temperature detected by bridge 2 is below the predetermined desired level the output of phase detector 7, presented at the collector of transistor 23, is a negative potential. Likewise, the output of phase detector 7 is a positive potential if the temperature detected by bridge 2 is above the desired level. As illustrated with amplifier 10 having three amplification stages, the signal from transformer 24 is out of phase with the signal applied to bridge network 2 as shown by the polarity dots. The output of phase detector 7 is coupled to regulating means 11 which supplies current to oven heater 13 from a D.-C. source. Amplifier 10 comprises PNP transistors 14, 15, and 16 connected in stages whereby the output of network 2 is coupled to the control electrode of transistor 14 and the output of amplifier 10 is taken from the collector electrode of transistor 16. Regulating means 11 comprises transistor 17 which receives the output of phase detector 7 at its control electrode and signal translating transistor 18 which receives the output from the emitter of transistor 17 at its control electrode. The current flowing in the emitter-collector circuit of transistor 18 is regulated in accordance with the output of amplifier 10 and phase detector 7 to supply current to heating element 13 in proportion to the output of bridge network 2. Thus, as the temperature in oven 1 rises above the pre-determined level adjusted at bridge network 2, a temperature change signal is greatly amplified by amplifier 10, presenting a signal through phase detector 7 to regulating means 11 which reduces the current flow in the emitter-collector circuit of transistor 18, thereby reducing the current supply to heater 13. The heat to oven 1 is correspondingly reduced which tends to reduce the temperature in oven 1 to the desired level. Similarly, a temperature change detected by bridge network 2 which is below the desired level is amplified by amplifier 10 and causes an increase in the flow of current through transistor 18 increasing the heat supply to oven 1 by heating element 13.

In order to provide stability of the servo system a short time constant between the heating element 13 and the temperature detecting bridge 2 is desired. To accomplish this, amplifier 10 is provided with a high gain, as much as 10,000, in order to provide a fast response time. Additionally, the operation of the transistors of amplifier 10 with the transistors of regulator 11 enhances the fast time response between detecting bridge 2 and heater 13. Thus a temperature change detected by bridge 2 is immediately compensated for by regulating the current flow through heating element 13.

In order to provide further stability and precision control of the temperature in oven 1 a negative feedback loop is provided between regulator 11 and bridge 2 which further shortens the time between the sensing of temperature and the compensation by heating element 13. The emitter of transistor 18 is connected through one current path including resistor 19 to the B+ terminal of a D.-C. source. The collector of transistor 18 is connected through heating element 13 in series to the ground side of the D.-C. source. The emitter of transistor 18 additionally in connected through a second current path including feedback resistor 20 and auxiliary heating element 21 to ground. Auxiliary heater 21 is in close thermal contact with thermistor 4, and in the preferred embodiment is embedded in the glass coating of thermistor 4. Auxiliary heater 21 receives a current from the emitter of transistor 18 which is proportional to the current flowing through the emitter-collector circuit of transistor 18. The exact amount of current is determined by the value of resistor 20 which is determined so that the current through auxiliary heater 21 is a small amount in order to provide the necessary lead network. As the current is varied through auxiliary heater 21 in accordance with the current flowing through transistor 18, thermistor 4 changes in resistance. Therefore, the resistance of thermistor 4 is dependent on the heat being supplied by auxiliary heater 21 as well as the temperature in oven heater 1. This auxiliary heat is directly proportional to the amount of current flowing through transistor 18 at the output of regulating means 11. The small amount of auxiliary heat causes thermistor 4 to present a signal at the output of bridge network 2 which is not only indicative of the change of temperature in oven 1 but is also indicative of the amount of current being supplied to heater 13 to compensate for the temperature change in oven 1. Thus in operation a negative feedback network is provided between the output of the servo loop at regulating means 11 and the input of the loop at bridge network 2 which is, in effect, a lead network.

In operation of the circuit, assuming that a temperature change has been detected by bridge network 2 indicating that the temperature of oven 1 is too high, a signal in accordance therewith is provided to the input of amplifier 10 by the output of bridge network 2. This signal, greatly amplified, is phase compared with the A.-C. signal from transformer 24 in phase detector 7 and operates to control transistors 17 and 18 of regulating means 11 to cause the current flowing through the emitter-collector circuit of transistor 18 to decrease. This decrease in current causes heating element 13 to provide less heat to oven 1, thereby tending to reduce the temperature to the normal level. Additionally, a negative feedback signal indicating the reduced flow of current through transistor 18 is fed from resistor 20 to auxiliary heater 21. Auxiliary heater 21, receiving less current from resistor 20, provides less heat to thermistor 4, causing the output of bridge network 2 to be reduced accordingly. Thus, in effect, bridge network 2 is sensing that the temperature in oven 1 has fallen before the temperature has actually fallen because of the feedback signal through auxiliary heater 21. A temperature change indicating that the temperature of oven 1 is too low operates the circuit in a like manner. Regulating means 11 increases the supply of current to heater 13 and additionally increases the feedback of current to auxiliary heater 21 causing the output of bridge 2 to present a signal to amplifier 10 which anticipates the rise in temperature of oven 1.

The temperature control servo system of this invention provides precision temperature control at any desired operating temperature above ambient. As illustrated in the preferred embodiment the control system operates to provide precision temperature control of materials in oven 1. The system may be applied to any device, taking into due consideration the particular thermal requirements. The control system operates without thermostats or relays and thus avoids errors inherent in systems utilizing these components.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a servo system for automatically controlling the temperature of a material, a resistor element for heating said material, a signal translating transistor device for continuously supplying current from a source to said resistor element, a temperature detecting bridge circuit for detecting changes in temperature of said material, means responsive to said bridge circuit for amplifying said changes in temperature, means responsive to said amplifying means for controlling the flow of current in said signal translating transistor device whereby the current through said heating element varies in accordance with the changes in temperature of said material, said transistor device being continuously conductive, and means responsive to the flow of current in said signal translating transistor device for feeding back a signal to said temperature detecting bridge, said signal being proportional to the current supplied to said heating element.

2. The combination recited in claim 1 wherein said temperature detecting bridge includes a thermistor element for detecting minute changes in temperature, and wherein said feedback means include an auxiliary heater element in heat transfer arrangement with said thermistor, said auxiliary heater being furnished a heating current by said feedback means, said auxiliary heater cooperating with said thermistor element whereby said bridge circuit presents an output signal to said amplifying means which anticipates change in temperature of said material.

3. In a servo system for automatically controlling the temperature of a material, a resistor element for heating said material, a signal translating transistor device having a control electrode and a pair of output electrodes for continuously supplying current from a source to said resistor element, a resistance bridge circuit having a temperature sensitive element in one leg for detecting minute changes in temperature of said material, means responsive to said bridge circuit for amplifying said changes in temperature, the output of said amplifying means connected to said control electrode to control the supply of current from said transistor device to said heating element, said transistor device being continuously conductive, an auxiliary heating element in thermal con- June 19, 1962     R. E. HUKEE     3,040,157
TEMPERATURE CONTROL SERVO SYSTEM
Filed Sept. 30, 1959
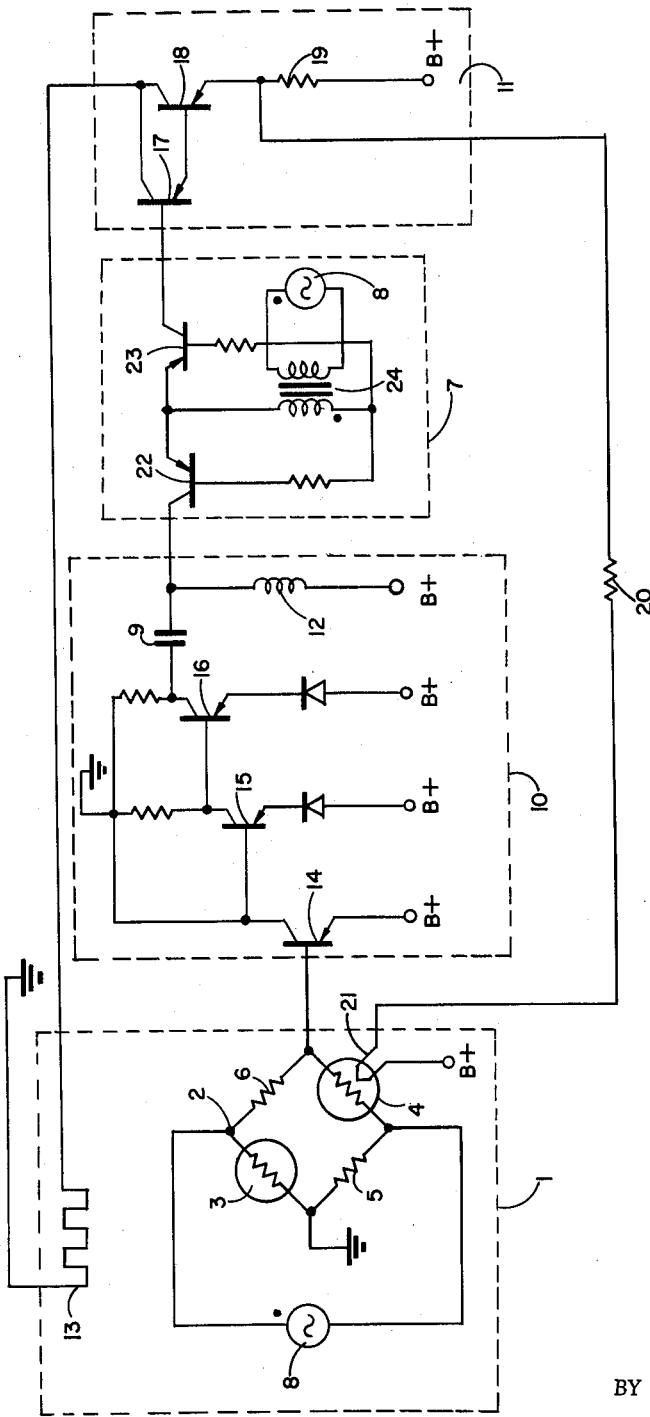
INVENTOR.
RUSSELL E. HUKEE
BY *John A. Duffy*
AGENT